US012780605B2

(12) United States Patent
Raghavendra Rao et al.

(10) Patent No.: US 12,780,605 B2
(45) Date of Patent: Nov. 3, 2026

(54) COUNTERWEIGHT MONITORING DEVICE

(71) Applicant: OTIS ELEVATOR COMPANY, Farmington, CT (US)

(72) Inventors: Anand Raghavendra Rao, Bangalore (IN); Joseph Crute, Cromwell, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1629 days.

(21) Appl. No.: 17/193,611

(22) Filed: Mar. 5, 2021

(65) Prior Publication Data

US 2022/0281718 A1 Sep. 8, 2022

(51) Int. Cl.
*B66B 7/02* (2006.01)
*B66B 5/00* (2006.01)

(52) U.S. Cl.
CPC ............ *B66B 7/027* (2013.01); *B66B 5/0006* (2013.01); *B66B 2201/301* (2013.01)

(58) Field of Classification Search
CPC .... B66B 7/027; B66B 5/006; B66B 2201/301
See application file for complete search history.

(56) References Cited

FOREIGN PATENT DOCUMENTS

JP S5467941 A 5/1979
JP S5563357 U 4/1980
JP 5142099 B2 * 2/2013

OTHER PUBLICATIONS

Extended European Search Report for EP Application No. 21 20 8439 dated Mar. 30, 2022.

* cited by examiner

*Primary Examiner* — Nirvana Deonauth
(74) *Attorney, Agent, or Firm* — Carlson, Gaskey & Olds, P.C.

(57) ABSTRACT

An illustrative example embodiment of a counterweight monitor device includes a boundary marker configured to be situated along a boundary of a counterweight space at a selected location along the counterweight path. A detector is configured for detecting a boundary marker change. The detector is configured to provide an output indicating a departure of any part of the counterweight from the counterweight space based on a detected boundary marker change.

16 Claims, 4 Drawing Sheets

COUNTERWEIGHT MONITORING DEVICE

BACKGROUND

Elevator systems have proven useful for carrying passengers among various levels within a building. There are various types of elevator systems. For example, some elevator systems are traction-based and include roping between the elevator car and a counterweight. A machine includes a traction sheave that causes movement of the roping to achieve the desired movement and positioning of the elevator car.

Under most operating conditions the components of an elevator system are in an arrangement or alignment that allows the elevator car and counterweight to travel along the hoistway without any interference. Some conditions may exist, however, that cause or introduce a misalignment of the counterweight. It is possible, for example, for a counterweight guiderail mounting bracket to loosen resulting in a section of the guiderail deviating from the intended counterweight path. Additionally, a seismic or high wind event may affect the hoistway or building in a manner that results in the counterweight becoming misaligned.

SUMMARY

An illustrative example embodiment of a counterweight monitor device includes a boundary marker configured to be situated along a boundary of a counterweight space at a selected location along the counterweight path. A detector is configured for detecting a boundary marker change. The detector is configured to provide an output indicating a departure of any portion of the counterweight from the counterweight space based on a detected boundary marker change.

In addition to one or more of the features described above, or as an alternative, the counterweight monitor device includes a mounting bracket that is configured to support at least the detector.

In addition to one or more of the features described above, or as an alternative, the mounting bracket supports a portion of the boundary marker.

In addition to one or more of the features described above, or as an alternative, the counterweight monitor device includes a plurality of mounting brackets, the boundary marker comprises an elongated structure, one of the mounting brackets supports one end of the boundary marker, and another one of the mounting brackets supports another end of the boundary marker.

In addition to one or more of the features described above, or as an alternative, the counterweight monitor device includes a second boundary marker, the boundary marker is supported near one end of the mounting brackets, respectively, and the second boundary marker is supported near another, opposite end of the mounting brackets, respectively.

In addition to one or more of the features described above, or as an alternative, the boundary marker comprises a cable and the boundary marker change comprises movement or deflection of the cable.

In addition to one or more of the features described above, or as an alternative, the boundary marker comprises a rod and the boundary marker change comprises movement or deflection of the cable.

In addition to one or more of the features described above, or as an alternative, the boundary marker comprises light including at least one beam of the light along the boundary, the detector comprises a light detector, and the boundary marker change comprises an interruption of the at least one beam of light.

In addition to one or more of the features described above, or as an alternative, the counterweight monitor device includes a source of the light and wherein the source of light and the detector are situated within a single housing configured to be situated along one side of the boundary.

In addition to one or more of the features described above, or as an alternative, the counterweight monitor device includes an elevator system includes the counterweight monitor device of any of the previous paragraphs, a counterweight, and an elevator car.

In addition to one or more of the features described above, or as an alternative, the counterweight is situated within the counterweight space for movement along the counterweight path, the elevator car is situated within an elevator space for movement along an elevator path, and the counterweight monitor device detects whether at least a portion of the counterweight enters the elevator space.

In addition to one or more of the features described above, or as an alternative, the counterweight is adjacent the elevator car along a passing portion of the counterweight path, and the selected location of the boundary marker is at least above or below the passing portion.

In addition to one or more of the features described above, or as an alternative, the counterweight monitor device includes a second counterweight monitor device including a second boundary marker and a second detector, the selected location of the boundary marker is above the passing portion of the counterweight path, and second boundary marker is situated below the passing portion of the counterweight path.

In addition to one or more of the features described above, or as an alternative, the counterweight monitor device includes a plurality of mounting brackets, the boundary marker comprises one of a cable or a rod, one of the mounting brackets supports one end of the boundary marker, and another one of the mounting brackets supports another end of the boundary marker.

In addition to one or more of the features described above, or as an alternative, the boundary marker change comprises movement or deflection of the cable or rod.

In addition to one or more of the features described above, or as an alternative, the boundary marker comprises light including at least one beam of the light along the boundary, the detector comprises a light detector, and the boundary marker change comprises an interruption of the at least one beam of light.

An illustrative example embodiment of a method of monitoring a counterweight includes situating a boundary marker along a boundary of a counterweight space at a selected location along a counterweight path; detecting a boundary marker change caused by at least a portion of a counterweight; and providing an output indicating a departure from the counterweight space based on the detected boundary marker change.

In addition to one or more of the features described above, or as an alternative, the boundary marker comprises one of a cable or a rod, and the boundary marker change comprises movement or deflection of the cable or rod.

In addition to one or more of the features described above, or as an alternative, the boundary marker comprises light including at least one beam of the light along the boundary, and the boundary marker change comprises an interruption of the at least one beam of light.

In addition to one or more of the features described above, or as an alternative, providing the output comprises providing a signal to stop movement of the counterweight.

The various features and advantages of at least one disclosed example embodiment will become apparent to those skilled in the art from the following detailed description. The drawings that accompany the detailed description can be briefly described as follows.

DETAILED DESCRIPTION

Figure 1:
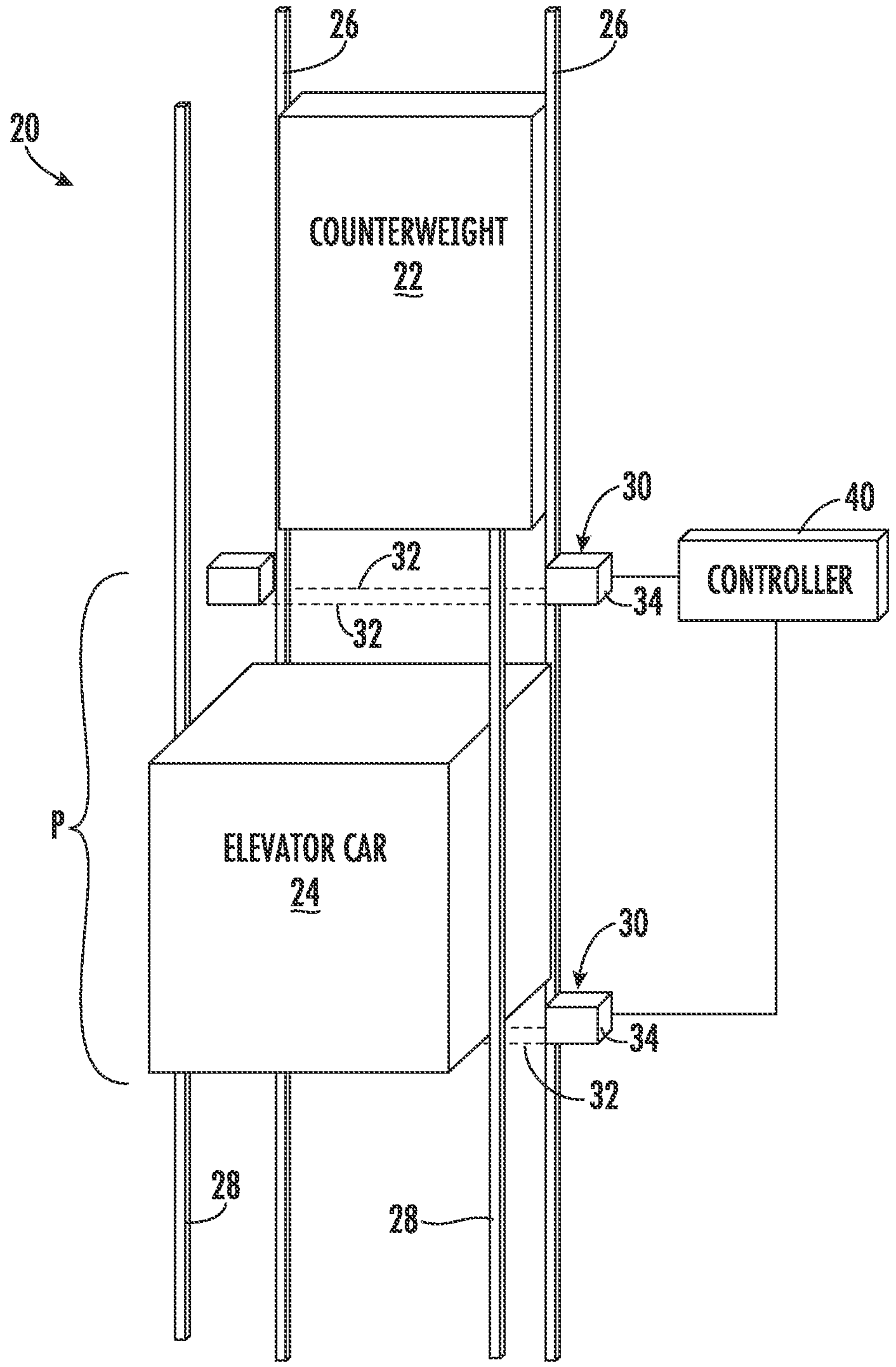
FIG. 1 schematically illustrates selected portions of an example embodiment of an elevator system including a counterweight monitoring device.

FIG. 1 schematically illustrates selected portions of an elevator system 20 including a counterweight 22 and an elevator car 24. As known in the elevator industry, the counterweight 22 and elevator car 24 are coupled together through a suspension assembly that is not illustrated. The counterweight 22 travels along a counterweight path as it moves along counterweight guiderails 26. The elevator car 24 travels along a car path as it moves along car guiderails 28.

Figure 2:
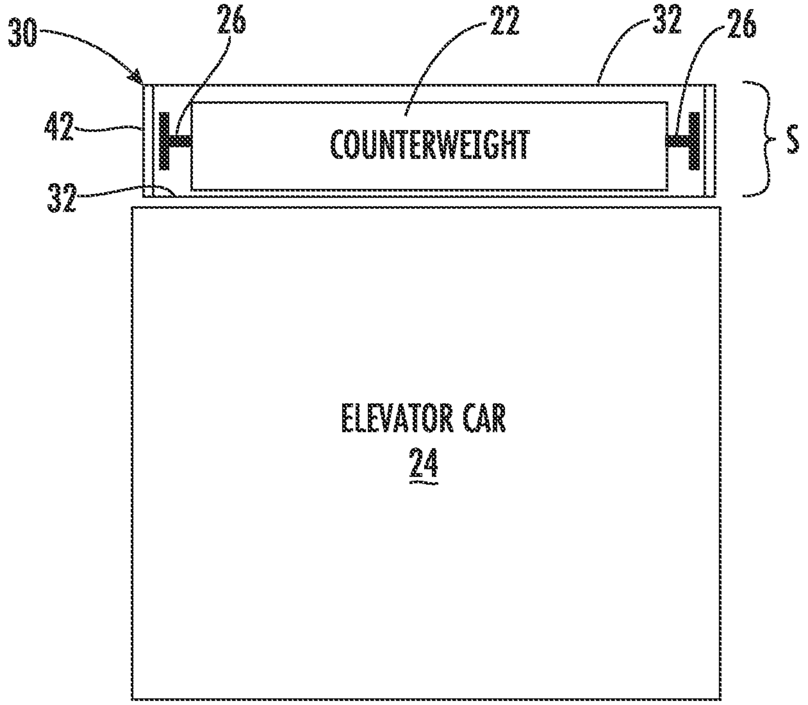
FIG. 2 schematically illustrates, from a top view, relative positioning of the counterweight and elevator car and the example counterweight monitor device.

As can be appreciated from FIGS. 1 and 2, the counterweight 22 and elevator car 24 are situated to move relative to each other along their respective paths without making any contact with each other. The counterweight 22 is situated to travel vertically within a counterweight space S as the counterweight 22 moves along the counterweight guiderails 26.

A counterweight monitor device 30 includes at least one boundary marker 32 configured to be situated along one edge of the counterweight space S at a selected location along the counterweight path. In the example of FIGS. 1 and 2, there are multiple counterweight monitor devices 30 and each of them includes a plurality of boundary markers 32. In the illustrated example embodiment, one of the boundary markers 32 is situated along the boundary between the counterweight space S and the space occupied by the elevator car 24 and the other boundary marker 32 is situated along the boundary between the counterweight space S and a hoistway wall (not illustrated).

The counterweight monitor devices 30 are situated near opposite ends of a passing portion P along the counterweight path where the elevator car 24 and the counterweight 22 at least partially overlap each other. In the passing portion P of the counterweight path, if any part of the counterweight 22 were to protrude outside of the counterweight space S, that part outside of the space S could come into contact with the elevator car 24 as the counterweight 22 moves within the passing portion P. Positioning counterweight monitor devices 30 above and below or near the top and bottom of the passing portion P facilitates detecting a condition in which the counterweight 22 is at least partially outside of the counterweight space S and there is a likelihood of contact with the elevator car 24.

The counterweight monitor devices 30 each include a detector 34 that detects a boundary marker change caused by any portion of the counterweight 22 that crosses the boundary of the counterweight space S. The detector 34 provides an output indicating a departure of at least a portion of the counterweight 22 from the counterweight space S whenever there is a boundary marker change. In the example of FIG. 1, the detector 34 provides an output to a controller 40 that controls movement of the elevator car 24 and counterweight 22. In some embodiments, the output from the detector 34 is interpreted or used by the controller 40 as a signal or command to stop movement of the elevator car 24 to avoid any collision or contact between the counterweight 22 and the elevator car 24.

Some embodiments include a single counterweight monitor device 30 near or in the pit at the bottom of the hoistway. In some embodiments, counterweight monitor devices 30 are also situated in other locations along a hoistway where it would be possible for the counterweight 22 to contact other components of the elevator system 20 if a part of the counterweight 22 were to protrude out of the counterweight space S.

Figure 3:
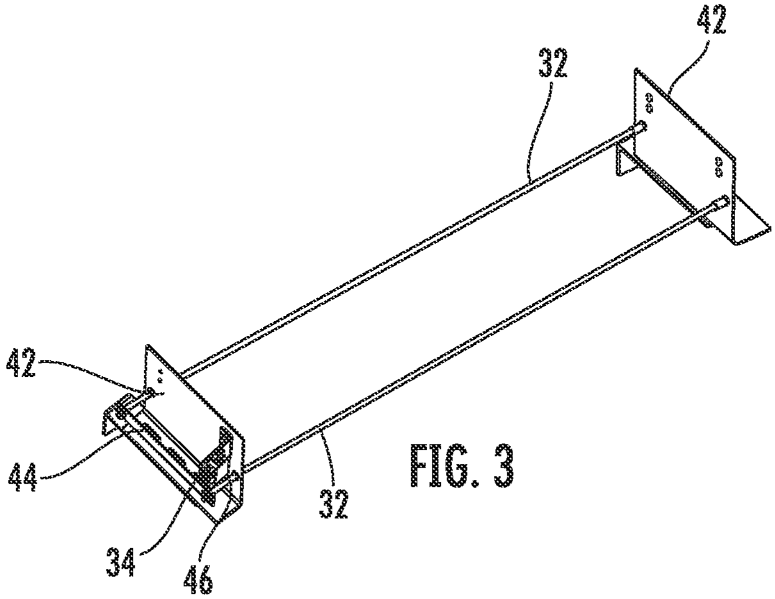
FIG. 3 diagrammatically illustrates an example embodiment of a counterweight monitor device.
Figure 4:
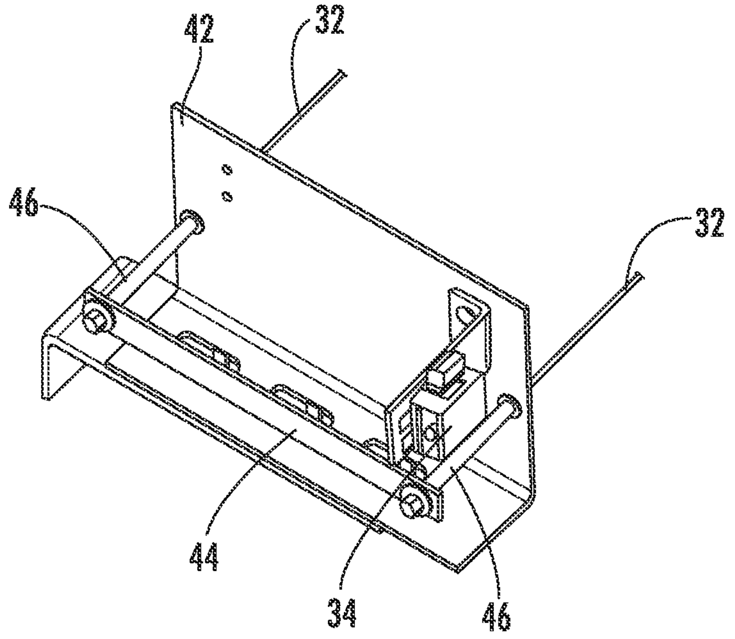
FIG. 4 shows selected portions of the embodiment shown in FIG. 3 in greater detail.

FIGS. 3 and 4 diagrammatically illustrate an example arrangement of a counterweight monitor device 30. In this example, the boundary markers 32 comprise physical barrier members having an elongate structure, such as rods, cables or cords. Such boundary markers 32 provide a physical marker of the boundary of the counterweight space S at a selected location along the counterweight path. A plurality of mounting brackets 42 are configured to be mounted within a hoistway near but independent of the counterweight guiderails 26. In this example, one of the boundary markers 32 has opposite ends supported by the mounting brackets 42 near one edge of the mounting brackets 42. The other boundary marker 32 has its opposite ends supported by the mounting brackets 42 near an opposite edge of the mounting brackets 42.

As can be appreciated from FIG. 4, a connecting lever 44 is associated with each of the boundary markers 32. Resilient mounting members 46, such as springs, allow for a boundary marker 32 to be moved or deflected relative to the mounting brackets 42 and the connecting lever 44 to responsively move toward the mounting bracket shown in FIG. 4. The detector 34 in this example includes a switch that is activated based upon movement of the connecting lever 44 resulting from a change in position or condition of either of the boundary markers 32. Any contact between a portion of the counterweight 22 and one of the boundary markers 32 will result in a change in the position or condition of that boundary marker that will cause movement of the connecting lever 44 and activation of the switch of the detector 34.

Figure 5:
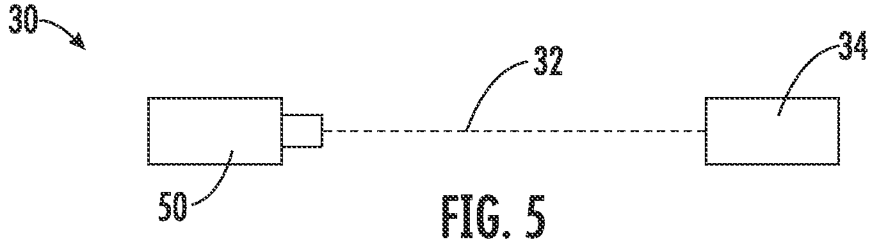
FIG. 5 schematically illustrates another example embodiment of a counterweight monitor device.

FIG. 5 schematically illustrates another example configuration of a counterweight monitor device 30. In this example, the boundary marker 32 comprises light including at least one beam of light. A light source 50 projects the light along the boundary of the counterweight space S. The detector 34, which comprises a light sensor or optical detector, is situated to detect the presence of the light. Whenever a portion of the counterweight 22 protrudes beyond the boundary of the counterweight space S, that portion of the counterweight 22 will interrupt the light of the boundary marker 32. The detector 34 in such embodiments is configured to detect a departure from the counterweight space S based upon an interruption of the light otherwise detected by the detector 34. In other words, when the detector 34 in this example embodiment does not detect light from the light source 50, that is interpreted as a boundary marker change resulting in the detector 34 providing an output indicating a departure from the counterweight space.

Figure 6:
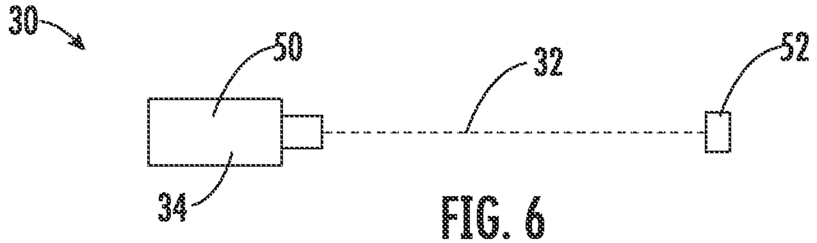
FIG. 6 schematically illustrates another example embodiment of a counterweight monitor device.

FIG. 6 schematically illustrates another example configuration of a counterweight monitor device 30. In this example, the light source 50 and the detector 34 are situated within a single housing on one side of the counterweight space S near one end of the boundary marker 32, which comprises light in this example. A deflector 52, such as a mirror, deflects the light from the light source 50 toward the detector 34. Like the embodiment of FIG. 5, the detector 34 in this configuration provides an output indicating departure from the counterweight space whenever a portion of the counterweight 22 interrupts the light that is situated along the boundary where the light is otherwise detected by the detector 34.

Figure 7:
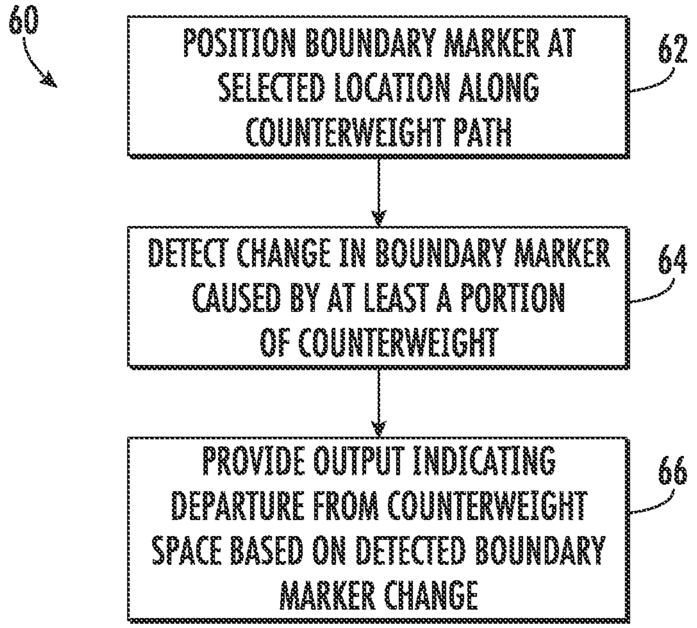
FIG. 7 is a flowchart diagram summarizing an example counterweight monitoring technique.

FIG. 7 is a flowchart diagram 60 summarizing an example approach for monitoring the counterweight 22. At 62, at least one boundary marker is positioned at a selected location along the counterweight path. At 64, at least one detector 34 detects when the boundary marker is contacted or interrupted by at least a portion of the counterweight 22. At 66, the detector 34 provides an output indicating the departure from the counterweight space based upon detecting the contact with or interruption of the boundary marker 32.

The features of the illustrated embodiments are not necessarily limited to the respective embodiments. Various combinations of the features of the example embodiments may be combined to realize additional embodiments.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A counterweight monitor device, comprising:

a boundary marker located along a boundary of a counterweight space at a selected location along a counterweight path that extends along a first direction, and wherein the boundary marker marks a boundary that extends along a second direction that is transverse to the first direction;

a detector configured for detecting a boundary marker change, the detector being configured to provide an output indicating a departure from the counterweight space based on a detected boundary marker change; and wherein the boundary marker comprises a first boundary marker extending between a set of brackets, and including:

a second boundary marker that extends in the second direction between the set of brackets and is spaced apart from the first boundary marker, and wherein each of the first boundary marker and the second boundary marker comprise a physical barrier member; and a connecting lever having one end associated with the first boundary marker and an opposite end associated with the second boundary marker.

2. The device of claim 1, comprising a mounting bracket that is configured to support at least the detector.

3. The device of claim 2, wherein the mounting bracket supports a portion of the first boundary marker and the second boundary marker.

4. The device of claim 3, comprising a plurality of mounting brackets and wherein:

the first boundary marker and the second boundary marker each comprise an elongated structure;

one of the plurality of mounting brackets supports one end of the first boundary marker and the second boundary marker; and another one of the plurality of mounting brackets supports another end of the first boundary marker and the second boundary marker.

5. The device of claim 4, wherein:

the first boundary marker is supported adjacent to one end of each of the plurality of mounting brackets, respectively; and the second boundary marker is supported adjacent to another, opposite end of each of the plurality of mounting brackets, respectively.

6. The device of claim 3, wherein the first boundary marker and the second boundary marker each comprise a cable and the boundary marker change comprises movement or deflection of the cable.

7. The device of claim 3, wherein the first boundary marker and the second boundary marker each comprise a rod and the boundary marker change comprises movement or deflection of the rod.

8. An elevator system comprising:

the counterweight monitor device of claim 1;

a counterweight movable along counterweight guiderails;

an elevator car movable along car guiderails; and at least one mounting bracket that is configured to support at least the detector, wherein the at least one mounting bracket is mounted facing the counterweight guiderails and independent of the counterweight guiderails.

9. The elevator system of claim 8, wherein:

the counterweight is located within the counterweight space for movement along the counterweight path that extends in the first direction along a length of the counterweight guiderails, and wherein the counterweight guiderails are spaced apart from each other in the second direction;

the elevator car is located within an elevator space for movement along an elevator path that extends in the first direction along a length of the car guiderails, and wherein the car guiderails are spaced apart from each other in the second direction;

the first boundary marker and the second boundary marker each extend along a path that is in the second direction; and the counterweight monitor device detects whether at least a portion of the counterweight enters the elevator space.

10. The elevator system of claim 9, wherein;

the counterweight is adjacent the elevator car along a passing portion of the counterweight path; and the selected location of the first boundary marker and the second boundary marker is at least above or below the passing portion.

11. The elevator system of claim 10, comprising a second counterweight monitor device that includes the second boundary marker that extends in the second direction and a second detector, wherein:

the selected location of the first boundary marker is above the passing portion of the counterweight path; and the second boundary marker is situated below the passing portion of the counterweight path.

12. The elevator system of claim 8, comprising a plurality of mounting brackets and wherein:

the first boundary marker and the second boundary marker each comprise one of a cable or a rod;

one of the plurality of mounting brackets supports one end of the first boundary marker and the second boundary marker; and another one of the plurality of mounting brackets supports another end of the first boundary marker and the second boundary marker.

13. The elevator system of claim 12, wherein the boundary marker change comprises movement or deflection of the cable or the rod.

14. The device of claim 1, wherein the second direction is perpendicular to the first direction.

15. The device of claim 1, including a first resilient mounting member associated with the first boundary marker and a second resilient mounting member associated with the second boundary marker, and wherein the first resilient mounting member and the second resilient mounting member allow the first boundary marker and second boundary marker to be moveable relative to the set of brackets and the connecting lever.

16. The device of claim 15, wherein the detector comprises a switch that is activated based upon movement of the connecting lever resulting from a change in position or condition of either of the first boundary marker or the second boundary marker.

* * * * *